United States Patent
Boday et al.

(10) Patent No.: US 9,534,068 B2
(45) Date of Patent: Jan. 3, 2017

(54) TULIPALIN A-BASED HYDROXYL-FUNCTIONALIZED POLYMERS, AND ENGINEERED MATERIALS PREPARED THEREFROM

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/470,046

(22) Filed: Aug. 27, 2014

(65) Prior Publication Data

US 2016/0060375 A1    Mar. 3, 2016

(51) Int. Cl.
*C08F 224/00*    (2006.01)
*C08F 124/00*    (2006.01)

(52) U.S. Cl.
CPC .......... *C08F 224/00* (2013.01); *C08F 124/00* (2013.01)

(58) Field of Classification Search
None
See application file for complete search history.

(56) References Cited

U.S. PATENT DOCUMENTS

| | | | |
|---|---|---|---|
| 2,624,723 A | 1/1953 | McGraw | |
| 3,250,756 A * | 5/1966 | Bergmeister | C08B 5/00 106/18.17 |
| 6,423,806 B1 | 7/2002 | Nakagawa et al. | |
| 7,022,792 B2 | 4/2006 | Gridnev et al. | |
| 7,932,336 B2 | 4/2011 | Pickett et al. | |
| 2003/0130414 A1 | 7/2003 | Brandenburg et al. | |
| 2007/0122625 A1 * | 5/2007 | Pickett | B32B 27/08 428/412 |

OTHER PUBLICATIONS

Agarwal et al (Biobased Polymers from Plant-Derived Tulipalin A, In Biobased Monomers, Polymers, and Materials; Smith, P., et al.; ACS Symposium Series; American Chemical Society: Washington, DC, 2012. pp. 197-212).*

Nolan (MeMBL: Ring-opening a pathway to a renewable, chemically customizable plastic, The Tower, vol. 1, No. 1, Fall 2008).*

(Continued)

*Primary Examiner* — Rachel Kahn
(74) *Attorney, Agent, or Firm* — Matthew J. Bussan

(57) ABSTRACT

A Tulipalin A-based hydroxyl-functionalized (hf) polymer is synthesized by converting, via a ring opening reaction, poly(Tulipalin A) or poly(Tulipalin A-co-acrylic) in the presence of a nucleophilic monomer and a catalyst. The nucleophilic monomer may be, for example, a nitrogen-containing monomer such as Dimethylamine. The poly (Tulipalin A) or the poly(Tulipalin A-co-acrylic) may be prepared, for example, via free radical polymerization using an initiator such as AIBN. Any suitable free radically copolymerizable monomer, such as N,N-Dimethylmethacrylamide, may be used in the preparation of the poly (Tulipalin A-co-acrylic). In some embodiments, an engineered material is prepared from the Tulipalin A-based hydroxyl-functionalized polymer using hydroxyl groups present therein as synthetic handles through which a plethora of useful properties can be directly engineered into the material.

14 Claims, 2 Drawing Sheets

(56) References Cited

OTHER PUBLICATIONS

Liu et al (A mild method for ring-opening aminolysis of lactones, Tetrahedron Letters 42 (2001) 2439-2441.).*
Huang et al (DIBAL—H—H2NR and DIBAL—H—HNR1R2•HCl complexes for efficient conversion of lactones and esters to amides, Tetrahedron Letters 42 (2001) 9039-9041.).*
Mosnacek et al., "Atom Transfer Radical Polymerization of Tulipalin A: A Naturally Renewable Monomer", Macromolecules, vol. 41, No. 15, 2008, pp. 5509-5511.
Mosnacek et al. "ATRP of Tulipalin A", Polymer Preprints, vol. 49, No. 2, 2008, pp. 26-27.
Unknown, "Organocatalysis," Wikipedia, The free encyclopedia, Jun. 15, 2016, 5 pages, printed from <https://en.wikipedia.org/w/indexphp?title=Organocatalysis&printable=yes> on Jun. 15, 2016.

\* cited by examiner

TULIPALIN A-BASED HYDROXYL-FUNCTIONALIZED POLYMERS, AND ENGINEERED MATERIALS PREPARED THEREFROM

BACKGROUND

The present invention relates in general to the field of biobased materials. More particularly, the present invention relates to hydroxyl-functionalized polymers prepared from α-Methylene-γ-butyrolactone (MBL), also known as Tulipalin A. The present invention also relates to engineered materials prepared from the Tulipalin A-based hydroxyl-functionalized polymers using hydroxyl groups present therein as synthetic handles.

SUMMARY

In accordance with some embodiments of the present invention, a Tulipalin A-based hydroxyl-functionalized (hf) polymer is synthesized by converting, via a ring opening reaction, poly(Tulipalin A) or poly(Tulipalin A-co-acrylic) to the Tulipalin A-based hf-polymer in the presence of a nucleophilic monomer and a catalyst. The nucleophilic monomer may be, for example, a nitrogen-containing monomer such as Dimethylamine. The poly(Tulipalin A) or the poly(Tulipalin A-co-acrylic) may be prepared, for example, via free radical polymerization using an initiator such as AIBN. Any suitable free radically copolymerizable monomer, such as N,N-Dimethylmethacrylamide, may be used in the preparation of the poly(Tulipalin A-co-acrylic). In some embodiments of the present invention, an engineered material is prepared from the Tulipalin A-based hf-polymer using hydroxyl groups present therein as synthetic handles through which a plethora of useful properties can be directly engineered into the material.

BRIEF DESCRIPTION OF THE SEVERAL VIEWS OF THE DRAWINGS

Embodiments of the present invention will hereinafter be described in conjunction with the appended drawings, where like designations denote like elements.

In FIG. 1, poly(Tulipalin A) is prepared via free radical polymerization using AIBN as an initiator, and then the poly(Tulipalin A) is converted, via a ring opening reaction, to the Tulipalin A-based hf-homopolymer in the presence of a nucleophilic monomer and a catalyst.

In FIG. 2, poly(Tulipalin A-co-acrylic) is prepared via free radical polymerization using AIBN as an initiator, and then the poly(Tulipalin A-co-acrylic) is converted, via a ring opening reaction, to the Tulipalin A-based hf copolymer in the presence of a nucleophilic monomer and a catalyst.

DETAILED DESCRIPTION

Figure 1:
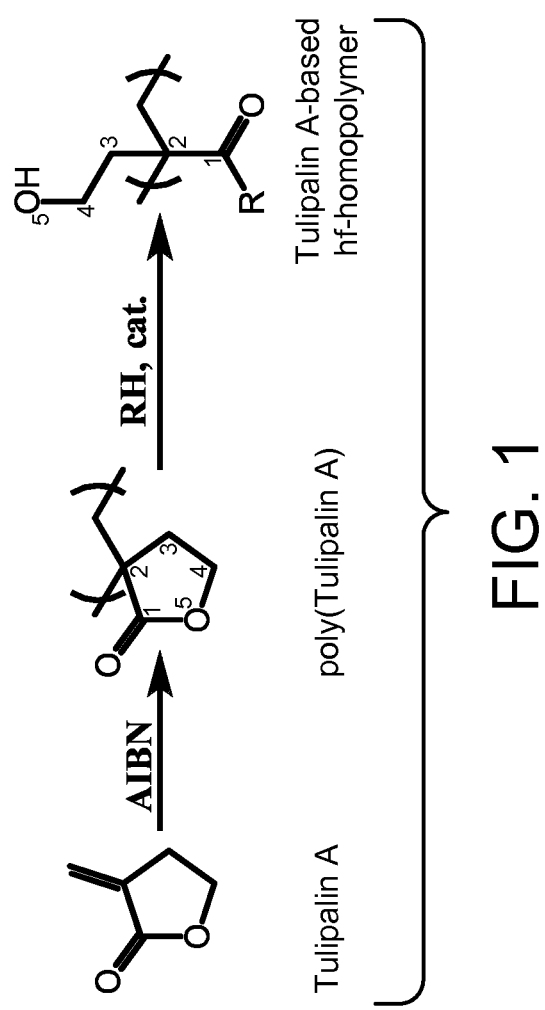
FIG. 1 is a general reaction scheme diagram showing the synthesis of a Tulipalin A-based hydroxyl-functionalized (hf) homopolymer in accordance with some embodiments of the present invention.

The depletion of fossil fuels from which the majority of polymers are derived, combined with supply chain instability and cost fluctuations of feed chemicals used to make these polymers, is driving the development and utilization of biobased plastics for commodity applications. Polymers derived from Tulipalin A, or α-Methylene-γ-butyrolactone (MBL), have been known for more than 60 years. MBL is referred to as "Tulipalin A" because it is present in relatively high concentrations in common tulips. Advantageously, Tulipalin A is renewably sourced. Both Tulipalin A and Tulipalin B (i.e., 2(3h)-Furanone, dihydro-4-hydroxy-3-methylene-, (S)—) occur in the common tulip *Tulipa gesneriana* L. Tulipalin A-based polymers constitute a burgeoning area of research in polymer science owing to Tulipalin A's rapid polymerization with common radical initiators, as well as the resulting polymer's high glass transition temperature and solvent resistance. Also driving growth in this area of research is the fact that Tulipalin A is renewably sourced, typically derived from the saccharide 6-tuliposide.

Tulipalin A can be viewed as a cyclic analogue of methyl methacrylate (MMA). For example, the reactivity of Tulipalin A in free radical polymerizations is comparable to that of MMA. Also, poly(Tulipalin A) is structurally similar to poly(Methyl methacrylate) (PMMA). PMMA is ubiquitous in polymer science and engineering, with applications as an organic glass, polycarbonate replacement, automotive parts, bone cement, etc. The use of PMMA, however, is not without drawbacks. For example, PMMA is sourced from petrochemicals, a finite resource. Also, unmodified PMMA is very brittle, and impact modifiers often come at the expense of other material properties such as modulus and glass transition temperature. Another drawback is that PMMA is incompatible with other polymers that, if homogeneously blended, could yield potentially useful and interesting properties (e.g., PMMA/Polyethylene (PE) blends are highly sought after materials). In addition, PMMA fails to meet UL 94 classifications required for flame-retardant applications.

In accordance with some embodiments of the present invention, a Tulipalin A-based hydroxyl-functionalized (hf) polymer is synthesized by converting, via a ring opening reaction, poly(Tulipalin A) or poly(Tulipalin A-co-acrylic) to the Tulipalin A-based hf-polymer in the presence of a nucleophilic monomer and a catalyst. The nucleophilic monomer may be, for example, a nitrogen-containing monomer such as Dimethylamine. The poly(Tulipalin A) or the poly(Tulipalin A-co-acrylic) may be prepared, for example, via free radical polymerization using an initiator such as AIBN. Any suitable free radically copolymerizable monomer, such as N,N-Dimethylmethacrylamide, may be used in the preparation of the poly(Tulipalin A-co-acrylic).

In some embodiments of the present invention, an engineered material is prepared from the Tulipalin A-based hf-polymer using hydroxyl groups present therein as synthetic handles through which a plethora of useful properties can be directly engineered into the material. Engineered materials that may be prepared to possess such useful properties include, but are not limited to, the following: impact-modified polymers, flame-retardant polymers, cross-linked polymers, compatibilizers for polymer blends, surface patterned polymers, etc.

FIG. 1 is a general reaction scheme diagram showing the synthesis of a Tulipalin A-based hydroxyl-functionalized (hf) homopolymer in accordance with some embodiments of the present invention. In FIG. 1, poly(Tulipalin A) is prepared via free radical polymerization using Azobisisobutyronitrile (AIBN) as an initiator, and then the poly(Tulipalin A) is converted, via a ring opening reaction, to the Tulipalin A-based hf-homopolymer in the presence of a nucleophilic monomer RH and a catalyst. Hence, as illustrated in FIG. 1, the preparation of the Tulipalin A-based hf-homopolymer involves a two-step reaction scheme.

Reaction Scheme 1, described below, sets forth a particular example of the general reaction scheme shown in FIG. 1—where the nucleophilic monomer RH is Dimethylamine ($(CH_3)_2NH$).

Although polymerization of Tulipalin A using AIBN is shown in the first step of the general reaction scheme shown in FIG. 1, one skilled in the art will appreciate that generally any of the known processes for polymerizing Tulipalin A may be used to prepare the poly(Tulipalin A). Such processes include, but are not limited to, free radical polymerization, atom transfer radical polymerization (ATRP), and group-transfer polymerization with Tris-(dimethylaminosulfonium) difluoride as a catalyst. In general, bulk and solution polymerization processes, using one or more solvents such as γ-Butyrolactone, N-Methyl-2-pyrrolidone (NMP), Dimethylformamide (DMF) and Dimethyl sulfoxide (DMSO), are particularly suitable.

The first step of the general reaction scheme shown in FIG. 1 is a free radical polymerization and is generally performed in a solvent such as γ-Butyrolactone, NMP, DMF and DMSO. The use of AIBN as an initiator is exemplary. One skilled in the art will appreciate that one or more other suitable initiators may be used in lieu of, or in addition to, AIBN. Suitable initiators include, but are not limited to, azonitriles and peroxides.

The second step of the general reaction scheme shown in FIG. 1 is a ring opening reaction and is generally performed in the presence of one or more suitable catalysts. Suitable catalysts include, but are not limited to, organocatalysts (e.g., Triazabicyclodecene).

The second step of the general reaction scheme shown in FIG. 1 may be, for example, a ring opening reaction in which Dimethyl sulfoxide (DMSO) is used as a solvent. In the second step of the general reaction scheme shown in FIG. 1, the bond between the carbon atom in position 1 of the poly(Tulipalin A) ring and the oxygen atom in position 5 of the poly(Tulipalin A) ring is broken in a ring opening reaction in which the R fragment (from the nucleophilic monomer RH) is bonded to the carbon atom (formerly in the ring's position 1) and the H fragment (from the nucleophilic monomer RH) is bonded to the oxygen atom (formerly in the ring's position 5).

With respect to the nucleophilic monomer RH used in the second step of the general reaction scheme shown in FIG. 1, R may be an oxygen-containing group such an alkoxy group or a nitrogen-containing group such as an amino group. Generally, the nucleophilic monomer RH is a protic nucleophile. The alkoxy group may be one or more carbon atoms of a straight, branched, cyclic configuration and combinations thereof attached to the parent structure (i.e., hydrogen atom) through an oxygen atom. Examples of suitable alkoxy groups include, but are not limited to, methoxy (—$OCH_3$), ethoxy, propoxy, isopropoxy, cyclopropyloxy, and cyclohexyloxy. The amino group may be a nitrogen atom attached by single bonds to hydrogen atoms, alkyl groups, aryl groups or any combination thereof. Examples of suitable amino groups include, but are not limited to, dimethylamino (—$N(CH_3)_2$), diethylamino, dipropylamino, diisopropylamino, cyclopropylamino, and cyclohexylamino.

Figure 2:
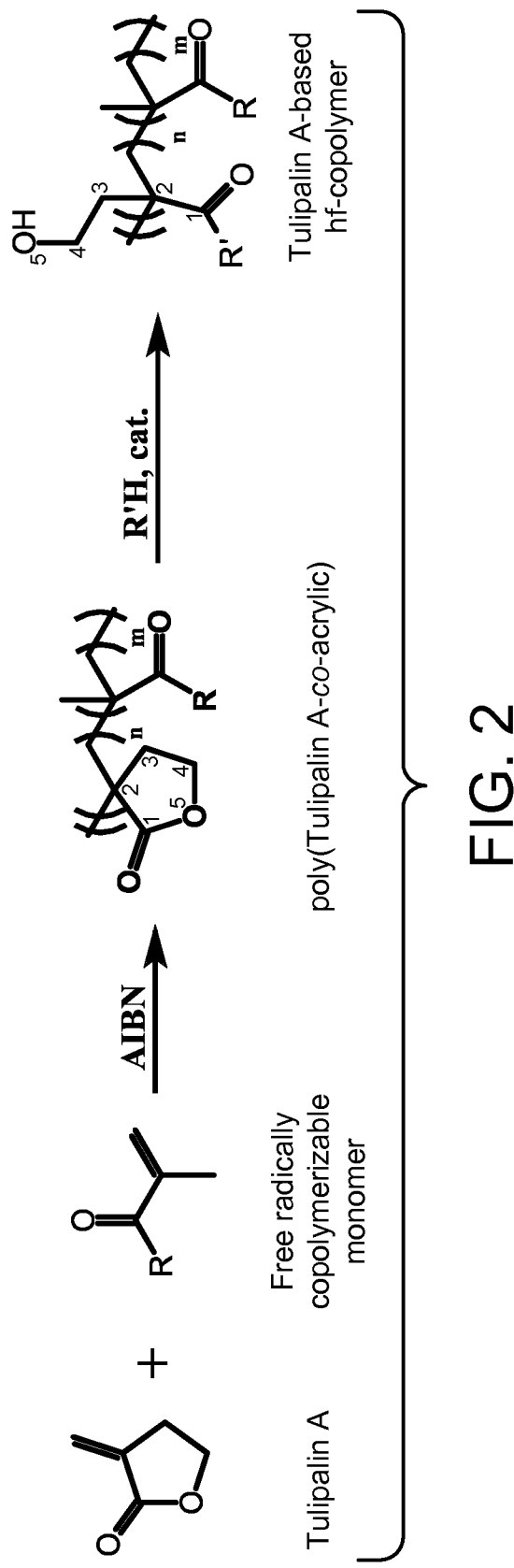
FIG. 2 is a general reaction scheme diagram showing the synthesis of a Tulipalin A-based hydroxyl-functionalized (hf) copolymer in accordance with some embodiments of the present invention.

FIG. 2 is a general reaction scheme diagram showing the synthesis of a Tulipalin A-based hydroxyl-functionalized (hf) copolymer in accordance with some embodiments of the present invention. In FIG. 2, poly(Tulipalin A-co-acrylic) is prepared via free radical polymerization of Tulipalin A and a free radically copolymerizable monomer RC(=O)C(=C)C using Azobisisobutyronitrile (AIBN) as an initiator, and then the poly(Tulipalin A-co-acrylic) is converted, via a ring opening reaction, to the Tulipalin A-based hf-copolymer in the presence of a nucleophilic monomer R'H and a catalyst.

Reaction Scheme 2, described below, sets forth a particular example of the general reaction scheme shown in FIG. 2—where the free radically copolymerizable monomer is N,N-Dimethylmethacrylamide and the nucleophilic monomer R'H is Dimethylamine ($(CH_3)_2NH$).

Although polymerization of Tulipalin A and a free radically copolymerizable monomer using AIBN is shown in the first step of the reaction scheme shown in FIG. 2, one skilled in the art will appreciate that generally any of the known processes for copolymerizing Tulipalin A and free radically copolymerizable monomers may be used to prepare the poly(Tulipalin A-co-acrylic). Such processes include, but are not limited to, free radical polymerization, atom transfer radical polymerization (ATRP), and group-transfer polymerization with Tris-(dimethylaminosulfonium) difluoride as a catalyst. In general, bulk and solution polymerization processes, using one or more solvents such as γ-Butyrolactone, N-Methyl-2-pyrrolidone (NMP), Dimethylformamide (DMF) and Dimethyl sulfoxide (DMSO), are particularly suitable.

The first step of the reaction scheme shown in FIG. 2 is a free radical polymerization and is generally performed in a solvent such as γ-Butyrolactone, NMP, DMF and DMSO. The use of AIBN as an initiator is exemplary. One skilled in the art will appreciate that one or more other suitable initiators may be used in lieu of, or in addition to, AIBN. Suitable initiators include, but are not limited to, azonitriles and peroxides.

With respect to the free radically copolymerizable monomer used in the first step of the reaction scheme shown in FIG. 2, any suitable free radically copolymerizable monomer may be used. Suitable free radically copolymerizable monomers need not contain a methacryl group as shown in FIG. 2. More generally, suitable free radically copolymerizable monomers include, but are not limited to, vinyl monomers. Suitable vinyl monomers include, but are not limited to, N,N-Dimethylmethacrylamide, Methacrylamide, Methacrylic acid and derivatives of Methacrylic acid, such as MMA, Ethyl acrylate, Butyl acrylate, Hydroxyethyl methacrylate, Acrylonitrile, Butyl methacrylate, Isobutyl methacrylate, 2-Ethylhexyl methacrylate, Lauryl methacrylate, Stearyl methacrylate, Methyl acrylate, Ethyl acrylate, n-Butyl acrylate, t-Butyl acrylate, 2-Ethylhexyl acrylate, Lauryl acrylate, Hydroxylethyl acrylate, Hydroxypropyl acrylate, Hydroxypropyl methacrylate, Acrylamide, Methacrylamide, Dimethylaminoethylacrylate, Dimethylaminoethyl methacrylate, Glycidyl acrylate and Glycidyl methacrylate, and aromatic vinyl compounds such as Styrene, Vinyl toluene, α-Methyl styrene, and t-Butyl styrene.

R in the free radically copolymerizable monomer shown in FIG. 2 may be, for example, an oxygen-containing group such an alkoxy group or a nitrogen-containing group such as an amino group. The alkoxy group may be one or more carbon atoms of a straight, branched, cyclic configuration and combinations thereof attached to the parent structure (i.e., methacrylate group) through an oxygen atom. Examples of suitable alkoxy groups include, but are not limited to, methoxy (—$OCH_3$), ethoxy, propoxy, isopropoxy, cyclopropyloxy, and cyclohexyloxy. The amino group may be a nitrogen atom attached to the parent structure (i.e., methacrylate group) and attached by single bonds to hydrogen atoms, alkyl groups, aryl groups or any combination thereof. Examples of suitable amino groups include, but are not limited to, dimethylamino (—N(CH$_3$)$_2$), diethylamino, dipropylamino, diisopropylamino, cyclopropylamino, and cyclohexylamino.

The second step of the general reaction scheme shown in FIG. 2 is a ring opening reaction and is generally performed in the presence of one or more suitable catalysts. Suitable catalysts include, but are not limited to, organocatalysts (e.g., Triazabicyclodecene).

The second step of the general reaction scheme shown in FIG. 2 may be, for example, a ring opening reaction in which Dimethyl sulfoxide (DMSO) is used as a solvent. In the second step of the general reaction scheme shown in FIG. 2, the bond between the carbon atom in position 1 of the Tulipalin A ring of the poly(Tulipalin A-co-acrylic) and the oxygen atom in position 5 of the Tulipalin A ring of the poly(Tulipalin A-co-acrylic) is broken in a ring opening reaction in which the R' fragment (from the nucleophilic monomer R'H) is bonded to the carbon atom (formerly in the ring's position 1) and the H fragment (from the nucleophilic monomer R'H) is bonded to the oxygen atom (formerly in the ring's position 5).

With respect to the nucleophilic monomer R'H used in the second step of the general reaction scheme shown in FIG. 2, R' may be an oxygen-containing group such an alkoxy group or a nitrogen-containing group such as an amino group. Generally, the nucleophilic monomer R'H is a protic nucleophile. The alkoxy group may be one or more carbon atoms of a straight, branched, cyclic configuration and combinations thereof attached to the parent structure (i.e., hydrogen atom) through an oxygen atom. Examples of suitable alkoxy groups include, but are not limited to, methoxy (—OCH$_3$), ethoxy, propoxy, isopropoxy, cyclopropyloxy, and cyclohexyloxy. The amino group may be a nitrogen atom attached by single bonds to hydrogen atoms, alkyl groups, aryl groups or any combination thereof. Examples of suitable amino groups include, but are not limited to, dimethylamino (—N(CH$_3$)$_2$), diethylamino, dipropylamino, diisopropylamino, cyclopropylamino, and cyclohexylamino.

Reaction Scheme 1, below, sets forth a particular example of the general reaction scheme shown in FIG. 1—where the nucleophilic monomer RH is Dimethylamine ((CH$_3$)$_2$NH).

Reaction Scheme 1

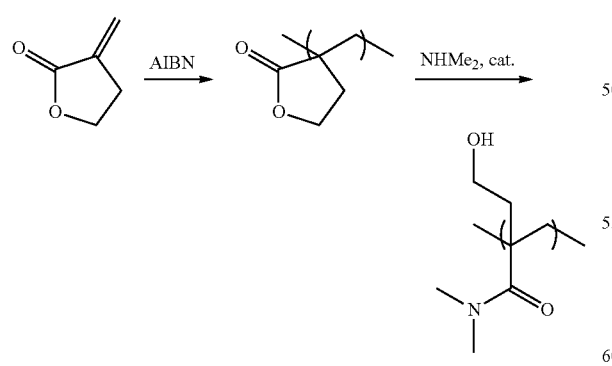

In Reaction Scheme 1, a Tulipalin A-based (dimethylamino)hf-homopolymer is synthesized in two steps. In the first step, poly(Tulipalin A) is prepared via free radical polymerization of Tulipalin A using Azobisisobutyronitrile (AIBN) as an initiator. In the second step, the poly(Tulipalin A) prepared in the first step is converted, via amine ring-opening, to the Tulipalin A-based (dimethylamino)hf-homopolymer in the presence of Dimethylamine and a catalyst.

Prophetic Example 1

Synthesis of Tulipalin A-Based (Dimethylamino)Hf-Homopolymer

Step 1. A vacuum flask is charged with Tulipalin A (10 g, 0.102 mol), along with degassed Dimethylsulfoxide (50 ml) as a solvent and AIBN (0.167 g, 0.001 mol) as a radical initiator. The flask is degassed by bubbling with Argon for 30 minutes. The temperature of the heating oil bath is maintained at approximately 70° C. for 4 hours. Then, the oil bath is cooled to room temperature. Finally, the resulting poly(Tulipalin A) is precipitated at least once into Methanol and dried at 75° C. under vacuum for overnight.

Step 2. A Teflon screw cap pressure flask is charged with the poly(Tulipalin A) (5 g) prepared in step 1 and 100 ml of a 5.0 M solution of Dimethylamine (10 equivalents relative to lactone), along with Triazabicyclodecene (2.13 g, 0.015 mol) as an organocatalyst. The flask is flushed with Argon and heated to 75° C. for 12 hours. Finally, the resulting Tulipalin A-based (dimethylamino)hf-homopolymer is precipitated at least once into Methanol and dried at 75° C. under vacuum for overnight.

Reaction Scheme 2, below, sets forth a particular example of the general reaction scheme shown in FIG. 2—where the free radically copolymerizable monomer is N,N-Dimethylmethacrylamide and the nucleophilic monomer R'H is Dimethylamine ((CH$_3$)$_2$NH).

Reaction Scheme 2

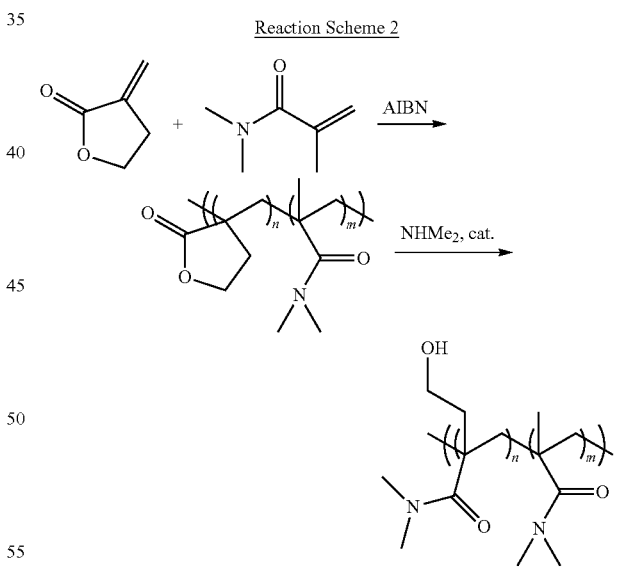

In Reaction Scheme 2, a Tulipalin A-based (dimethylamino)hf-copolymer is synthesized in two steps. In the first step, poly(Tulipalin A-co-dimethylacrylamide) is prepared via free radical polymerization of Tulipalin A and N,N-Dimethylmethacrylamide using Azobisisobutyronitrile (AIBN) as an initiator. In the second step, the poly(Tulipalin A-co-dimethylacrylamide) prepared in the first step is converted, via amine ring-opening, to the Tulipalin A-based (dimethylamino)hf-copolymer in the presence of Dimethylamine and a catalyst.

Prophetic Example 2

Synthesis of Tulipalin A-Based (Dimethylamino)Hf-Copolymer

Step 1. A vacuum flask is charged with Tulipalin A (5 g, 0.051 mol) and N,N-Dimethylmethacrylamide (5 g, 0.05 mol), along with degassed Dimethylsulfoxide (50 ml) as a solvent and AIBN (0.167 g, 0.001 mol) as a radical initiator. The flask is degassed by bubbling with Argon for 30 minutes. The temperature of the heating oil bath is maintained at approximately 70° C. for 4 hours. Then, the oil bath is cooled to room temperature. Finally, the resulting poly (Tulipalin A-co-dimethylacrylamide) is precipitated at least once into Methanol and dried at 75° C. under vacuum for overnight.

Step 2. A Teflon screw top pressure flask is charged with the poly(Tulipalin A-co-dimethylacrylamide) (5 g) prepared in step 1 and 100 ml of a 2.5 M solution of Dimethylamine (10 equivalents relative to lactone), along with Triazabicyclodecene (1.07 g, 0.008 mol) as an organocatalyst. The flask is flushed with Argon and heated to 75° C. for 12 hours. Finally, the resulting Tulipalin A-based (dimethylamino)hf copolymer is precipitated at least once into Methanol and dried at 75° C. under vacuum for overnight.

In accordance with some embodiments of the present invention, the hydroxyl groups of the Tulipalin-based hf-polymers are functionalized with a variety of different chemical moieties targeted for a myriad of specific applications. Reaction Schemes 3-6, described below, represent but a few of such applications. One skilled in the art will appreciate that the number of such applications and the variety of the engineered materials achievable through such embodiments of the present invention is substantial.

Reaction Scheme 3, below, sets forth an exemplary crosslinked copolymer of tunable crosslink density synthesized using the hf-copolymer produced via the general reaction scheme shown in FIG. 2 in accordance with some embodiments of the present invention.

Reaction Scheme 3

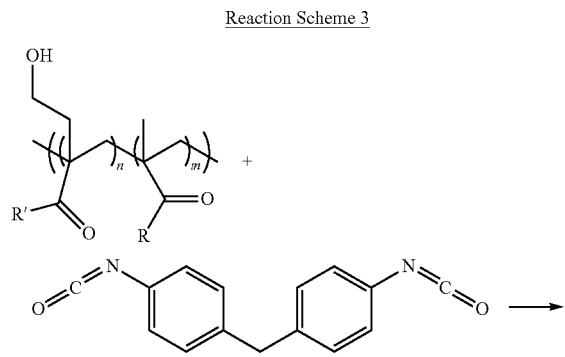

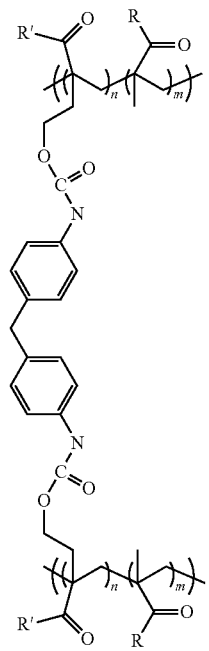

-continued

In Reaction Scheme 3, the exemplary crosslinked copolymer is synthesized by reacting the hf-copolymer and Methyl diphenyl diisocyanate (MDI). In this reaction, the hydroxyl groups present in the hf-copolymer serve as synthetic handles. These hydroxyl groups react with the isocyanate groups present in the MDI. Only one crosslink is shown in Reaction Scheme 3 for the sake of simplicity. The crosslink density of the resulting crosslinked copolymer is "tunable" through variation of the number of hf-units (n) in the hf-copolymer relative to the number of non-hf-units (m) in the hf-copolymer. The reaction product may be purified using techniques well known in the art.

Alternatively, a crosslinked homopolymer (without tunable crosslink density) may be synthesized by reacting the hf-homopolymer produced via the general reaction scheme FIG. 1 and MDI. In this alternative reaction, the hydroxyl groups present in the hf-homopolymer serve as synthetic handles. These hydroxyl groups react with the isocyanate groups present in the MDI. The reaction product, which is a crosslinked homopolymer, may be purified using techniques well known in the art.

MDI is an exemplary crosslinking reactant. One skilled in the art will appreciate that other crosslinking reactants capable of reacting with the hydroxyl groups present in the hf-copolymer (or the hf-homopolymer) may be used in lieu of, or in addition to, MDI. Other crosslinking reactants that are suitable include, but are not limited to, other isocyanate crosslinkers, as well as vinyl and epoxy crosslinkers.

Reaction Scheme 4, below, sets forth an exemplary flame-retardant copolymer synthesized using the hf-copolymer produced via the general reaction scheme shown in FIG. 2 in accordance with some embodiments of the present invention.

Reaction Scheme 4

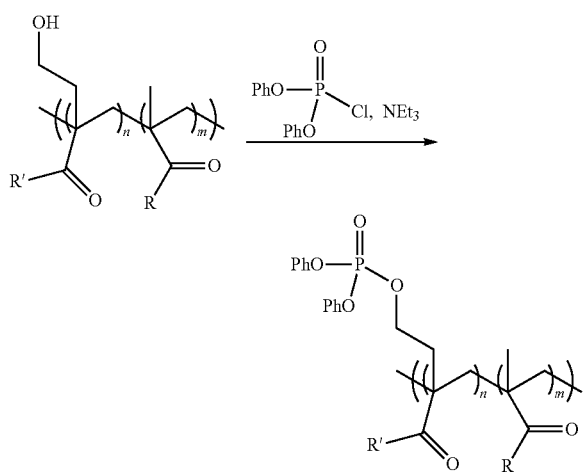

In Reaction Scheme 4, the exemplary FR-copolymer is synthesized by reacting the hf-copolymer and Diphenyl phosphoryl chloride in the presence of a catalyst such as Triethylamine ($NEt_3$) (also referred to as "$Et_3N$", "TEA" and "N,N-Diethylethanamine"). In this reaction, the hydroxyl groups present in the hf-copolymer serve as synthetic handles. These hydroxyl groups react with the chlorine atom present in the Diphenyl phosphoryl chloride via a condensation reaction. The reaction is typically performed at approximately 0° C., often in an ice bath. The reaction product may be purified using techniques well known in the art.

Alternatively, a FR-homopolymer may be synthesized by reacting the hf-homopolymer produced via the general reaction scheme FIG. 1 and Diphenyl phosphoryl chloride in the presence of a catalyst such as $NEt_3$. In this alternative reaction, the hydroxyl groups present in the hf-homopolymer serve as synthetic handles. These hydroxyl groups react with the chlorine atom present in the Diphenyl phosphoryl chloride via a condensation reaction. The reaction is typically performed at approximately 0° C., often in an ice bath. The reaction product, which is a FR-homopolymer, may be purified using techniques well known in the art.

Diphenyl phosphoryl chloride is an exemplary phosphorous-containing monomer. One skilled in the art will appreciate that other phosphorous-containing monomers capable of reacting with the hydroxyl groups present in the hf-copolymer (or the hf-homopolymer) via a condensation reaction may be used in lieu of, or in addition to, Diphenyl phosphoryl chloride. Phosphorus-containing monomers suitable for reacting with the hydroxyl groups present in the hf-copolymer (or the hf-homopolymer) via a condensation reaction to produce a FR-copolymer (or a FR-homopolymer) in accordance with some embodiments of the present invention may be either obtained commercially or synthesized. For example, suitable phosphorus-containing monomers that may be obtained commercially include, but are not limited to, Diphenyl phosphoryl chloride, Diphenylphosphinic chloride, Diethyl chlorophosphate, Dimethyl chlorophosphate, Diisopropyl chlorophosphate, Chlorodiphenylphosphine, and combinations thereof. Generally, suitable phosphorus-containing monomers include, but are not limited to, phosphonic chlorides, chlorophosphates, alkyl/aryl phosphonates, or other phosphorus-containing monomers known for flame retardancy (e.g., phosphinates, phosphonates, phosphate esters, and combinations thereof).

Phosphonic chlorides and chlorophosphates are listed among the suitable phosphorus-containing monomers for purposes of illustration, not limitation. Suitable phosphorus-containing monomers may alternatively contain other halogen atoms or hydrogen atoms that participate in the condensation reaction in lieu of chlorine atoms.

Suitable phosphorus-containing monomers also include (or may be synthesized from) conventional phosphorus-based flame retardants, such as phosphonates (e.g., Dimethyl methyl phosphonate; Diethyl ethyl phosphonate; Dimethyl propyl phosphonate; Diethyl N,N-bis(2-hydroxyethyl) amino methyl phosphonate; Phosphonic acid, methyl(5-methyl-2-methyl-1,3,2-dioxaphosphorinan-5-y) ester, P,P'-dioxide; and Phosphonic acid, methyl(5-methyl-2-methyl-1,3,2-dioxaphosphorinan-5-yl) methyl, methyl ester, P-oxide), phosphate esters (e.g., Triethyl phosphate; Tributyl phosphate; Trioctyl phosphate; and Tributoxyethyl phosphate), and phosphinates.

A conventional phosphorus-based flame retardant typically includes one or more of a phosphonate, a phosphate ester, or a phosphinate. Conventional phosphorus-based flame retardants that are phosphonates have the following generic molecular structure:

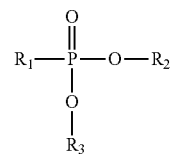

where $R_1$, $R_2$ and $R_3$ are organic substituents (e.g., alkyl, aryl, etc.) that may be the same or different.

Conventional phosphorus-based flame retardants that are phosphate esters have the following generic molecular structure:

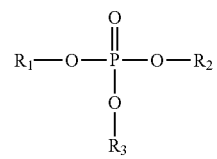

where $R_1$, $R_2$ and $R_3$ are organic substituents (e.g., alkyl, aryl, etc.) that may be the same or different.

Conventional phosphorus-based flame retardants that are phosphinates have the following generic molecular structure:

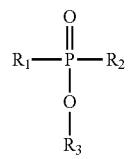

where $R_1$, $R_2$ and $R_3$ are organic substituents (e.g., alkyl, aryl, etc.) that may be the same or different.

One or more of the above conventional phosphorus-based flame retardants (i.e., phosphonate, phosphate ester, and/or phosphinate) and/or other conventional phosphate-based flame retardants may be functionalized (e.g., halogenated) using procedures well known to those skilled in the art to produce functionalized phosphorus-containing monomers suitable for reacting with the hydroxyl groups present in the hf-copolymer (or the hf-homopolymer) via a condensation reaction to produce a FR-copolymer (or a FR-homopolymer) in accordance with some embodiments of the present invention. Hence, either halogen atoms of functionalized phosphorus-containing monomers or hydrogen atoms of the conventional phosphorus-based flame retardants may participate in the condensation reaction.

Reaction Scheme 5, below, sets forth an exemplary impact-modified copolymer synthesized using the hf-copolymer produced via the general reaction scheme shown in FIG. 2 in accordance with some embodiments of the present invention.

Reaction Scheme 5

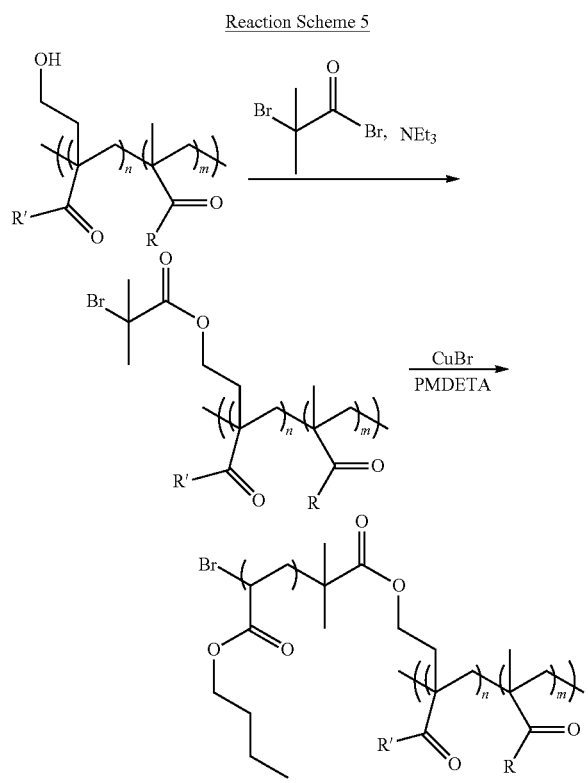

In Reaction Scheme 5, the exemplary impact-modified copolymer is synthesized in two steps. In the first step, the hf-copolymer and α-Bromoisobutyryl bromide are reacted in the presence of a catalyst such as Triethylamine (NEt$_3$) (also referred to as "Et$_3$N", "TEA" and "N,N-Diethylethanamine"). In this reaction, the hydroxyl groups present in the hf-copolymer serve as synthetic handles. These hydroxyl groups react with one of the bromine atoms present in the α-Bromoisobutyryl bromide via a condensation reaction. The reaction is typically performed at approximately 0° C., often in an ice bath. In the second step, the brominated copolymer produced in the first step in the presence of a copper (I) (e.g., CuBr), an appropriate ligand (e.g., N,N,N', N',N-Pentamethyldiethylenetriamine (PMDETA)) and a monomer capable of undergoing radical polymerization (e.g., Butyl acrylate) undergoes an atom transfer radical polymerization (ATRP) reaction to form the impact-modified copolymer. Generally, the polymerization of the monomer via ATRP may be performed in a suitable solvent such as Toluene at 80-90° C. Alternatively, the ATRP reaction may be performed in a melt state (e.g., no solvent) using melt polymerization. Melt polymerization techniques are well known in the art. The reaction product may be purified using techniques well known in the art.

Alternatively, an impact-modified homopolymer may be synthesized in an analogous two-step reaction scheme. In the first step, the hf-homopolymer produced via the general reaction scheme FIG. 1 and α-Bromoisobutyryl bromide are reacted in the presence of a catalyst such as NEt$_3$. In this alternative reaction, the hydroxyl groups present in the hf-homopolymer serve as synthetic handles. These hydroxyl groups react with one of the bromine atoms present in the α-Bromoisobutyryl bromide via a condensation reaction. The reaction is typically performed at approximately 0° C., often in an ice bath. In the second step, the brominated homopolymer produced in the first step in the presence of a copper (I) (e.g., CuBr), an appropriate ligand (e.g., N,N,N', N',N-Pentamethyldiethylenetriamine (PMDETA)) and a monomer (e.g., Butyl acrylate) capable of undergoing radical polymerization undergoes an atom transfer radical polymerization (ATRP) reaction to form the impact-modified homopolymer. Generally, the polymerization of the monomer via ATRP may be performed in Toluene at 80-90° C. Alternatively, the ATRP reaction may be performed in a melt state (e.g., no solvent) using melt polymerization. Melt polymerization techniques are well known in the art. The reaction product, which is an impact-modified homopolymer, may be purified using techniques well known in the art.

In the first step of Reaction Scheme 5, α-Bromoisobutyryl bromide is an exemplary alkyl pseudohalide. One skilled in the art will appreciate that other alkyl pseudohalides may be used in lieu of, or in addition to, α-Bromoisobutyryl bromide.

In the second step of Reaction Scheme 5, Butyl acrylate is an exemplary impact modifier capable of undergoing radical polymerization. One skilled in the art will appreciate that other impact modifiers capable of undergoing radical polymerization may be used in lieu of, or in addition to, Butyl acrylate. Suitable examples of impact modifiers capable of undergoing radical polymerization (e.g., styrenic, vinylic, acrylic, etc.) include, but are not limited to, styrene, butyl acrylate, methyl acrylate, 2-ethylhexyl acrylate, ethyl acrylate, 2-ethylhexl methacrylate, ethyl methacrylate, butyl methacrylate, and combinations thereof.

In the second step of Reaction Scheme 5, CuBr/PMDETA together are an exemplary catalytic complex. One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bipyridines and bi-, tri- and tetradentate amines. Specific examples of suitable ligands include 4,4'-dinonyl-2,2'bipyridine (DNBP), N,N,N', N',N-Pentamethyldiethylenetriamine (PMDETA), and 1,1,4, 7,10,10-hexamethyltriethylenetetramine (HMTETA).

Reaction Scheme 6, below, sets for an exemplary compatibilizer copolymer synthesized using the hf-copolymer produced via the general reaction scheme shown in FIG. 2 in accordance with some embodiments of the present invention.

Reaction Scheme 6

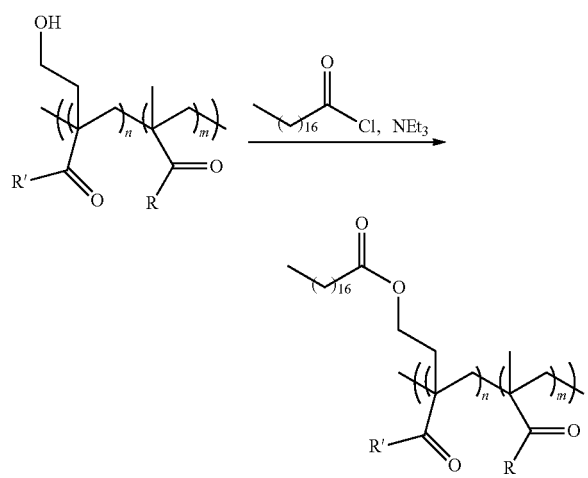

In Reaction Scheme 6, the exemplary compatibilizer copolymer is synthesized by reacting the hf-copolymer and Stearoyl chloride in the presence of a catalyst such as Triethylamine ($NEt_3$) (also referred to as "$Et_3N$", "TEA" and "N,N-Diethylethanamine"). In this reaction, the hydroxyl groups present in the hf-copolymer serve as synthetic handles. These hydroxyl groups react with the chlorine atom present in the Stearoyl chloride via a condensation reaction. The reaction is typically performed at approximately 0° C., often in an ice bath. The reaction product may be purified using techniques well known in the art.

Alternatively, a compatibilizer homopolymer may be synthesized by reacting the hf-homopolymer produced via the general reaction scheme FIG. 1 and Stearoyl chloride in the presence of a catalyst such as $NEt_3$. In this alternative reaction, the hydroxyl groups present in the hf-homopolymer serve as synthetic handles. These hydroxyl groups react with the chlorine atom present in the Stearoyl chloride via a condensation reaction. The reaction is typically performed at approximately 0° C., often in an ice bath. The reaction product, which is a compatibilizer homopolymer, may be purified using techniques well known in the art.

Stearoyl chloride is an exemplary compatibilizing monomer. One skilled in the art will appreciate that other compatibilizing monomer capable of reacting with the hydroxyl groups present in the hf-copolymer (or the hf-homopolymer) via a condensation reaction may be used in lieu of, or in addition to, Stearoyl chloride. Other compatibilizing monomers that are suitable include, but are not limited to, Lauroyl chloride, Myristoyl chloride, and Palmitoyl chloride.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method for synthesizing a Tulipalin A-based hydroxyl functionalized polymer, comprising:
    providing a poly(Tulipalin A-co-acrylic);
    converting, via a ring opening reaction, the poly(Tulipalin A-co-acrylic) in the presence of a nucleophilic monomer R'H and an organocatalyst to form a Tulipalin A-based hydroxyl functionalized polymer represented by the following formula:

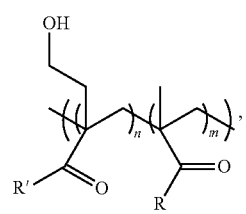

wherein R is an amino group, and wherein R' is an amino group.

2. The method as recited in claim 1, wherein the providing a poly(Tulipalin A-co-acrylic) comprises polymerizing, via free radical polymerization, Tulipalin A and a free radically copolymerizable monomer represented by the formula by the following formula:

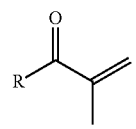

wherein R is an amino group, in the presence of a radical initiator to form the poly(Tulipalin A-co-acrylic).

3. The method as recited in claim 1, further comprising:
    reacting the Tulipalin A-based hydroxyl functionalized polymer and a phosphorous-containing monomer to form a flame-retardant polymer.

4. The method as recited in claim 1, further comprising:
    reacting the Tulipalin A-based hydroxyl functionalized polymer and Diphenyl phosphoryl chloride in the presence of a catalyst to form a flame-retardant polymer represented by the following formula:

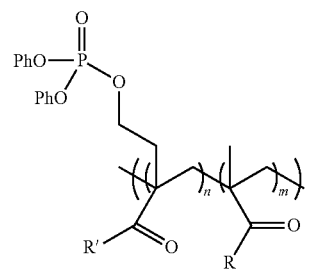

wherein R is an amino group, and wherein R' is an amino group.

5. The method as recited in claim 4, wherein the organocatalyst is Triazabicyclodecene, and wherein the catalyst is Triethylamine.

6. The method as recited in claim 1, further comprising:
    reacting the Tulipalin A-based hydroxyl functionalized polymer and an alkyl pseudohalide to form a brominated polymer;
    reacting the brominated polymer and an impact modifier to form an impact-modified polymer.

7. The method as recited in claim 1, further comprising:
reacting the Tulipalin A-based hydroxyl functionalized polymer and a compatibilizing monomer to form a compatibilizer polymer.

8. The method as recited in claim 1, further comprising:
reacting the Tulipalin A-based hydroxyl functionalized polymer and a crosslinking reactant to form a crosslinked copolymer of tunable crosslink density, wherein the crosslinked copolymer has a crosslink density that is tunable through variation of the number of hydroxyl functionalized units (n) in the Tulipalin A-based hydroxyl functionalized polymer relative to the number of non-hydroxyl functionalized units (m) in the Tulipalin A-based hydroxyl functionalized polymer.

9. The method as recited in claim 1, wherein the organocatalyst is Triazabicyclodecene.

10. The method as recited in claim 2, wherein the free radically copolymerizable monomer is N,N-Dimethylmethacrylamide, and wherein the radical initiator is Azobisisobutyronitrile.

11. The method as recited in claim 2, wherein the free radically copolymerizable monomer is N,N-Dimethylmethacrylamide, wherein the radical initiator is Azobisisobutyronitrile, and wherein the nucleophilic monomer R'H is Dimethylamine.

12. The method as recited in claim 3, wherein the phosphorous-containing monomer is Diphenyl phosphoryl chloride.

13. A method for synthesizing a Tulipalin A-based hydroxyl functionalized polymer, comprising:
providing poly(Tulipalin A-co-dimethylacrylamide) by polymerizing, via free radical polymerization, Tulipalin A and N,N-Dimethylmethacrylamide in the presence of a radical initiator to form the poly(Tulipalin A-co-dimethylacrylamide) represented by the following formula:

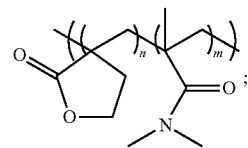

converting, via a ring opening reaction, the poly(Tulipalin A-co-dimethylacrylamide) in the presence of Dimethylamine and an organocatalyst to form a Tulipalin A-based hydroxyl functionalized polymer represented by the following formula:

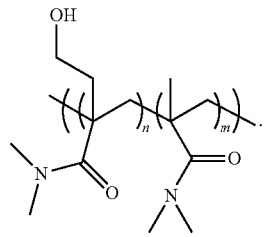

14. The method as recited in claim 13, wherein the radical initiator is Azobisisobutyronitrile, and wherein the organocatalyst is Triazabicyclodecene.

* * * * *